United States Patent [19]

Holmes

[11] 4,298,893

[45] Nov. 3, 1981

[54] T.V. ENERGIZED BY EXERCISE CYCLE

[76] Inventor: James H. Holmes, 31 Willis Rd. (P.O. Box 66657), Scotts Valley, Calif. 90566

[21] Appl. No.: 182,436

[22] Filed: Aug. 29, 1980

[51] Int. Cl.³ .............................................. H04N 3/18
[52] U.S. Cl. ...................................... 358/190; 358/93
[58] Field of Search .................. 358/190, 93; 455/345, 455/346; 310/75 B, 75 C

[56] References Cited

U.S. PATENT DOCUMENTS 2,488,021  11/1949  May .................................. 310/75 C

Primary Examiner—Richard Murray
Attorney, Agent, or Firm—Robert G. Slick

[57] ABSTRACT

A television set is energized by electricity generated by an exercise cycle. The bicycle may be used to charge a battery which in turn operates the T.V. set or the exercise cycle can turn a generator which directly operates the set. The device is particularly useful in limiting the amount of "junk" T.V. watched by children.

6 Claims, 3 Drawing Figures

T.V. ENERGIZED BY EXERCISE CYCLE

SUMMARY OF THE INVENTION

At the present time many people, and particularly children, spend a large amount of time watching low quality or "junk" T.V. programs when they might spend their time better reading or exercising outdoors. The device of the present invention was developed primarily to put a brake on excessive television watching by children by requiring that they do a substantial amount of work in the form of operating a generator in order to watch television.

Although the device was developed primarily to prevent excessive T.V. watching by children it will be recognized that the device is of broad applicability and might be utilized in many other instances such as in isolated communities without regular electric service or during power blackouts.

Generally speaking the objects of the present invention are achieved by providing a pedal operated device, such as an ordinary exercise cycle, which drives a generator of some sort and the electricity thus generated is used to actuate the television set.

In accordance with one embodiment of the invention the exercise cycle is provided with an alternator-rectifier combination as is common with present day cars which is used to charge a battery and/or operate a D.C.-A.C. inverter which provides the output necessary to operate an ordinary T.V. set designed to operate from electric mains.

In accordance with another embodiment of the invention a D.C. television set is employed, such as those commonly provided for battery operation, and this can be driven directly from a D.C. generator with or without a battery.

Obviously many variations can be made in this exact scheme, for instance, the D.C. generator might be substituted for the alternator-rectifier or vise versa.

In accordance with a preferred embodiment of the invention a meter is also provided which is visible to the operator of the television set so that he can measure his actual electric output which, of course, is particularly valuable for those exercising to loose weight.

Many additional features and advantages of the invention will be brought out in the balance of the specification.

DESCRIPTION OF THE PREFERRED EMBODIMENTS

Figure 1:
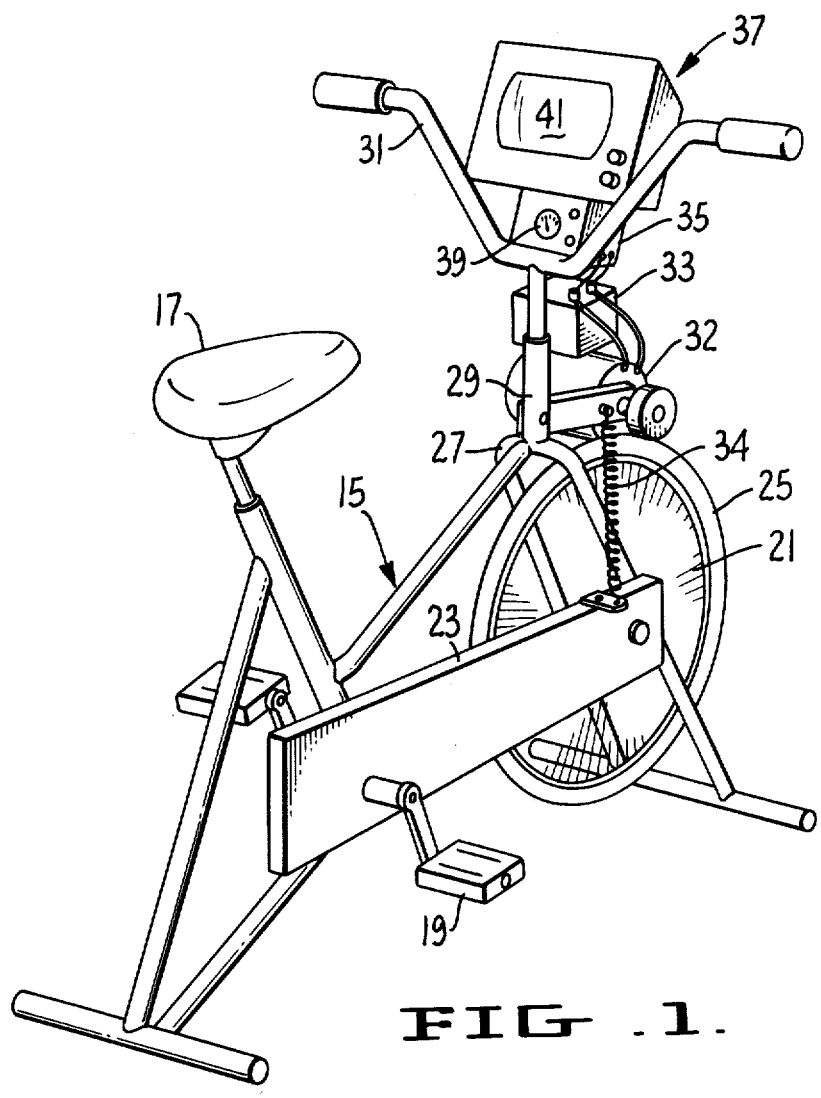
FIG. 1 is a perspective view of a device embodying the present invention.

Referring now to the drawings by reference characters, there is shown an exercise cycle of the usual type having a frame 15 supporting a seat 17, pedals 19 and a wheel 21. Wheel 21 is driven by pedals 19 by a suitable drive mechanism such as a chain (not shown) within housing 23. The wheel 21 is provided with the usual rubber tire 25 which revolves within the forks 27. At the top of the forks 27 is member 29 supporting the usual handlebars 31.

Mounted on the member 29 is an alternator 32, said alternator having a rectifier built in, as is as common in the automotive art, or 32 can be a D.C. generator. Spring 34 serves to bias the generator against tire 25. This is employed to charge a storage battery 33 and the output from the storage battery and/or alternator is passed through a D.C-A.C. inverter 35 which produces the normal alternating current for operating a television set, generally designated 37. Inverter 35 can also include a meter 39, preferably graduated to show the rate at which the electricity is generated as in watts, horsepower or foot pounds per second or the total amount of energy produced may also be measured by the meter. Television set 37 has the usual screen 41 and the screen is readily visible to the person seated on the seat 17. Also, meter 39 is readily visible. It is apparent from the foregoing that the only way in which one can watch television is by working for it. In many instances, an individual, and particularly a child, is incapable of the sustained effort to watch television continuously in which case the person can build up a "credit" by charging the battery so that the person actually pedals for a longer period of time than watches.

Figure 2:
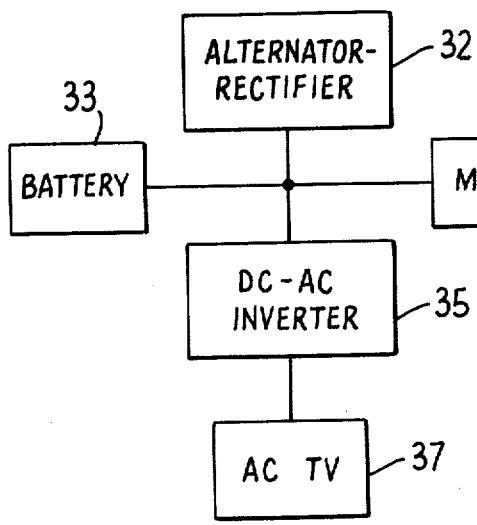
FIG. 2 is a block diagram of an electrical circuit wherein an alternator-rectifier is employed.

FIG. 2 shows a block diagram of a typical set up wherein alternator 31 is connected to battery 33 and an optional meter 39 and the output is passed through inverter 35 which produces the usual 110 V 60 Hz A.C. necessary to operate the television set 37. Since this scheme utilizes a television set designed to operate from the A.C. mains it obviously takes a substantial amount of energy to run the set.

Figure 3:
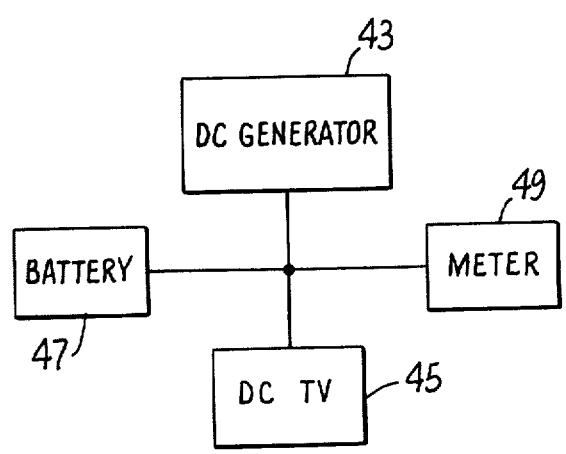
FIG. 3 is a similar block diagram showing the use of a D.C. generator.

A more efficient scheme is shown in FIG. 3 wherein a D.C. generator 43 can be hooked directly to a D.C. television set 45 and the circuit may or may not include a battery 47 and a meter 49.

Although FIG. 1 shows a preferred embodiment of the invention wherein a single unit is provided, it is obviously not necessary that the television set, battery and/or inverter be mounted upon the exercise bicycle. Any of these units, other than the generator or alternator could be separate and the T.V. might be an ordinary household T.V. set at a convenient viewing angle to one on the seat.

Although certain preferred embodiments of the invention have been shown, it will be obvious to those skilled in the art that many variations can be made without departing from the spirit of this invention.

The subject matter to be claimed is:

1. A stationary pedal operated T.V. set including in combination:
   a. a television set,
   b. a pedal operated electric generator and,
   c. means connecting said generator to said television set whereby operating said pedals causes said television set to operate.

2. The combination of claim 1 wherein said electric generating means is an alternator-rectifier.

3. The combination of claim 1 wherein said electric generating means is a D.C. generator.

4. The combination of claim 1 having a storage battery whereby said electric generating means can be used to charge said battery and/or operate said television set.

5. The combination of claim 1 having included therein a meter whereby one can measure the electric output when operating said pedals and/or the total amount of energy produced.

6. The combination of claim 1 wherein said pedal operated device includes a seat and handlebars mounted on a frame, as in an exercise bicycle, and wherein said electric generating means and television set are mounted on said frame to provide a single piece unit.

* * * * *